Sept. 16, 1952 H. J. McCREARY 2,611,119

FREQUENCY GENERATOR EMPLOYING A MAGNETIC DOUBLE CROSS VALVE

Filed Sept. 15, 1950 3 Sheets-Sheet 1

INVENTOR.
HAROLD J. McCREARY

BY Chas. Tu. Candy

ATTORNEY

FREQUENCY GENERATOR EMPLOYING A MAGNETIC DOUBLE CROSS VALVE

Filed Sept. 15, 1950 3 Sheets-Sheet 2

*INVENTOR.*
HAROLD J. McCREARY
*BY* Chas. W. Candy
ATTORNEY

FREQUENCY GENERATOR EMPLOYING A MAGNETIC DOUBLE CROSS VALVE

Filed Sept. 15, 1950 3 Sheets-Sheet 3

INVENTOR.
HAROLD J. McCREARY

BY [signature]

ATTORNEY

Patented Sept. 16, 1952 2,611,119

UNITED STATES PATENT OFFICE 2,611,119

FREQUENCY GENERATOR EMPLOYING A MAGNETIC DOUBLE CROSS VALVE

Harold J. McCreary, Lombard, Ill., assignor to Automatic Electric Laboratories, Inc., Chicago, Ill., a corporation of Delaware Application September 15, 1950, Serial No. 184,970

10 Claims. (Cl. 321—68)

This invention relates in general to frequency generating devices and in particular to an improved magnetic cross valve employing a double cross for accomplishing such frequency generating.

The principal object of the invention is to provide an improved self-starting frequency generator which is positive in operation and is compact and economical to manufacture.

It is another object of the invention to provide such an improved frequency generator having a unitary magnetic structure.

It is another object of the invention to provide such an improved frequency generator that will supply a varying load at a practically constant output voltage.

Other objects and features will appear upon a further perusal of the specification and the accompanying drawings, in which.

Figures 1, 2, 3, 4, 5, 6, 7, 8, 9:
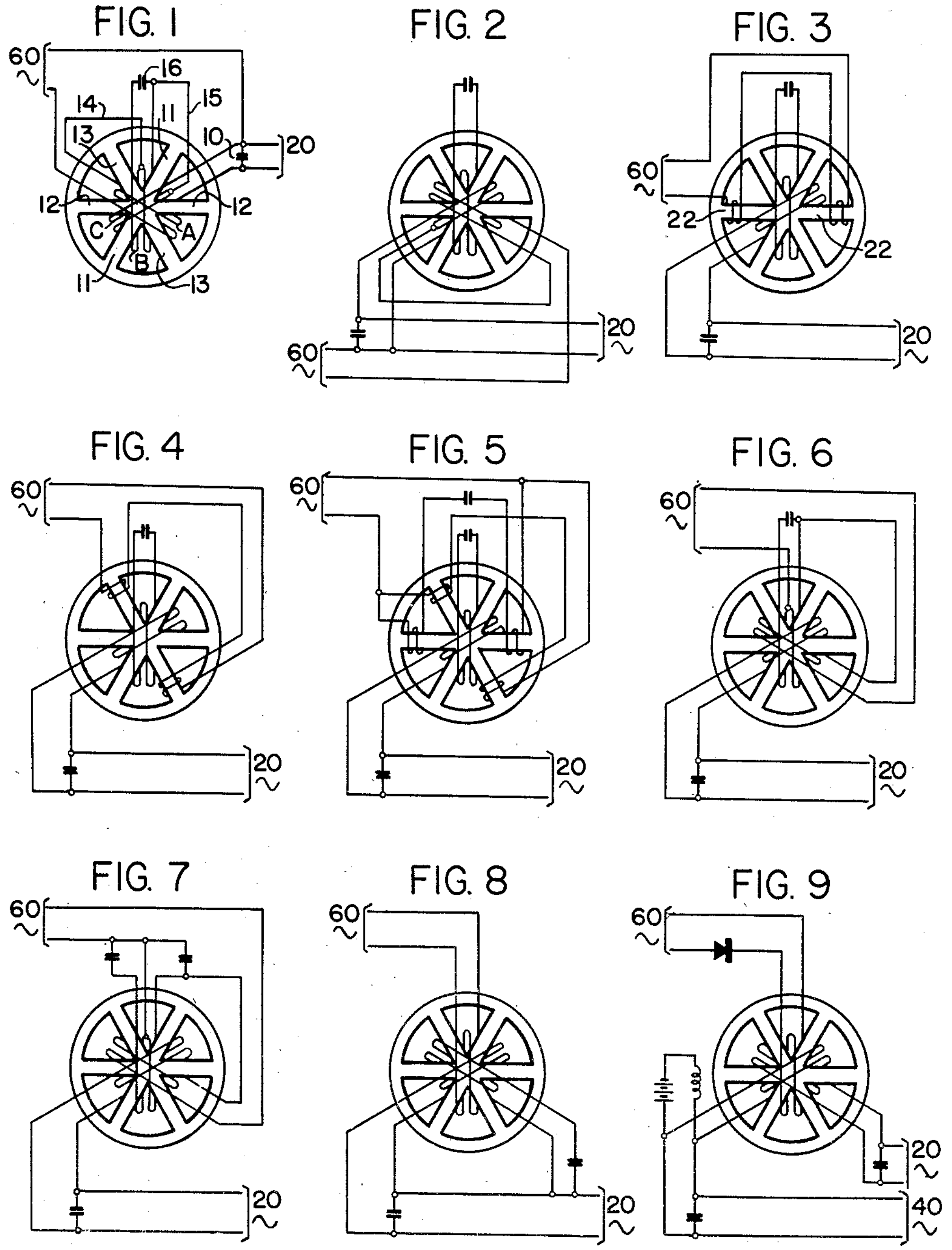
Figs. 1-9 show various arrangements of the magnetic double cross valve that accomplish the desired result—i. e. producing a different frequency from that supplied.
Figure 10:
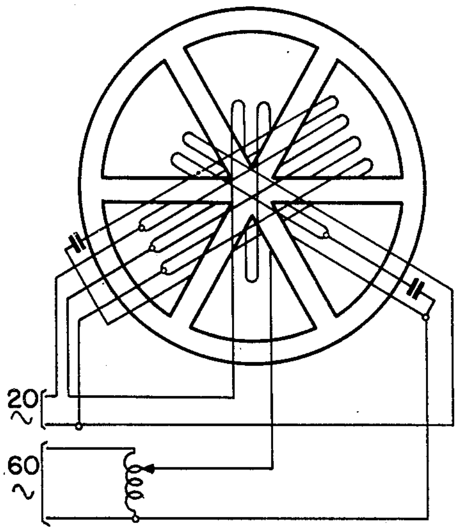
Fig. 10 shows another arrangement for producing a different frequency, 20 cycles in the present embodiment.
Figure 11:
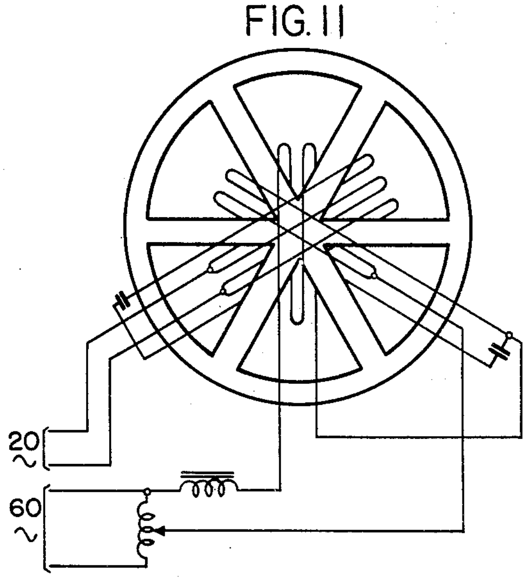
Fig. 11 shows another circuit for generating 20 cycles with the added feature of an input choke for preventing abnormally high oscillations in the system.
Figure 12:
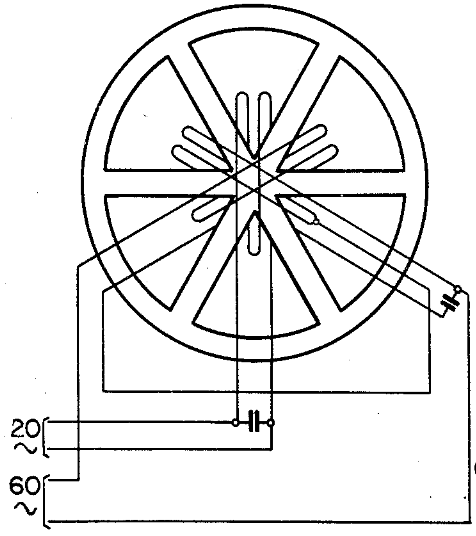
Fig. 12 shows still another arrangement for producing 20 cycles.
Figure 13:
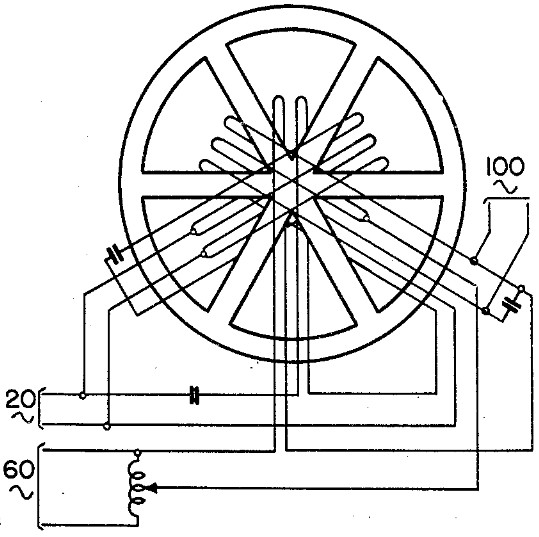
Fig. 13 shows a circuit arrangement very similar to that shown in Fig. 11 but with an added circuit for feeding harmonics from the 20 cycle coil back to a 100 cycle and 60 cycle coil through a small condenser.
Figure 14:
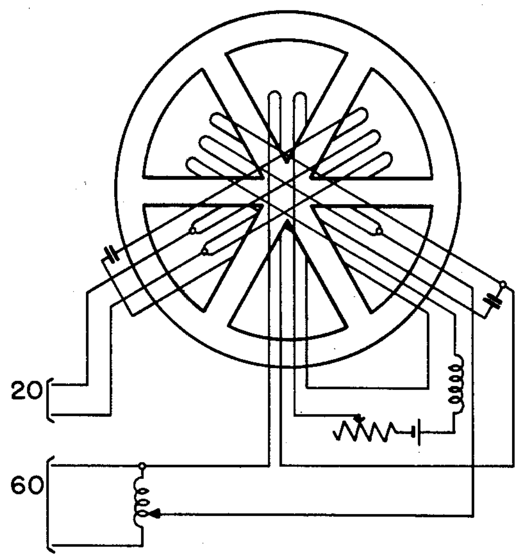
Fig. 14 shows still another circuit for generating 20 cycles with an added direct voltage stabilizing means.
Figure 15:
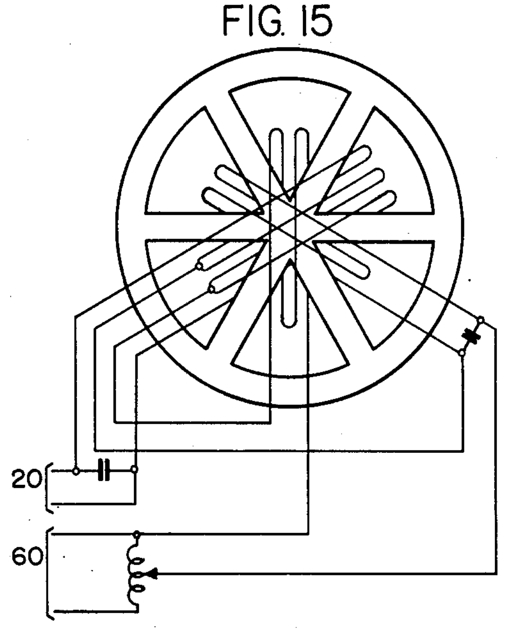
Fig. 15 shows a circuit rendering exceptionally good starting characteristics as well as excellent voltage regulation.

Referring now to the drawings it can be seen that the double cross valve consists of a magnetic core having three intersecting legs or sections joined at their outer ends by a circular section, a first coil wound around one pair of diagonally opposite corners of the intersection, a second coil wound around a second pair of diagonally opposite corners of the intersection, and a third coil wound, of course, around the remaining pair of diagonally opposite corners. There are various condensers placed across, or rather substantially across in some cases, the windings and are of such a value that when combined with an associated winding a tuned "tank" circuit will be formed to provide a resonant circuit at a pre-determined frequency. It might be said at this point that although 20 cycles per second has been shown to be the principal output frequency the inventor does not, of course, wish to be merely limited thereto. Practically any other combination of frequencies could also be generated utilizing very similar arrangements as those herein described and shown. From the drawings it can be seen that a relatively large number of circuit arrangements have been shown—all producing essentially the same result.

While the inventor does not wish to be limited to any particular theory, a simple manner of how this frequency generator could be operated will be explained. A consideration of the operation of the well known three phase induction motor is a logical introduction of this possible theory of operation hereinafter described. In such a motor three separate coils are wound on the stator. In an actual machine, the winding of each phase is not concentrated in one coil but spread over the periphery of the air gap. However, there will always be an axis for each phase, and therefore each winding may be replaced by a coil having the same axis. The axes of the three coils make 120° with each other in space. The current in each phase coil varies sinusoidally and therefore effects a changing flux field in the direction of the coil's axis. Now inasmuch as the three phase currents are 120° out of time phase their respective resulting flux fields will combine to form one single composite flux field, which may be represented by a flux vector, that actually rotates in space in one plane at a rate corresponding to the input frequency. This rotating flux field, as is well known in the art, causes the rotor to revolve. Returning to the instant invention and referring to Fig. 1 for example (the theory of operation of all the various circuit arrangements being the same), it can be seen that coils A, B, and C also have their respective axes at 120° in space relationship. It therefore follows that any alternating current through coils A, B, and C will effect respective flux fields principally through core leg sections 11, 12, and 13. The three flux fields will thus interact or rather combine in the central intersecting portion of the system—as at the center of the suggested analogous three phase induction motor. The resultant single composite flux field produced in the center of the magnetic double cross valve could likewise be represented by a flux vector that actually changes position in space in one plane depending on the frequency of the currents in each coil. Naturally if each phase voltage of a three phase source was applied to the three coils this resultant flux vector would rotate exactly as in the case of the induction motor hereinbefore discussed. However, if the frequency of the current in each coil (A, B and C) was different, the resultant flux vector would not rotate and describe a circle but would instead describe some irregular Lissajous figure—somewhat similar to an oscillogram produced on an oscilloscope when a different frequency is impressed across one set of deflection plates from that frequency impressed on the other. It is therefore established that a resultant flux field will vary in position in the central intersecting portion of the double cross valve system, the pattern described by the resultant vector depending on the frequency of the currents in the three coils A, B, and C.

Considering now what takes place initially and immediately upon application of the 60 cycle source voltage to the system, it will be seen how the resultant composite flux field hereinbefore described will be produced. The 60 cycle current through one of the coils will effect a varying flux field through its respective core leg (11 in Fig. 1) and will induce an initial voltage into the remaining coils. The coils not directly connected to the 60 cycle source only require a "shock" voltage to kick its associated pre-tuned "tank" circuit into oscillation. The momentary initial oscillation of any tuned circuit caused by an introduction of a voltage is, of course, well known in the art. As mentioned hereinbefore, the condensers associated with the coils are of such value that in combination with their respective coils provide a resonant circuit "tuned" to a predetermined frequency. An application of voltage, be it nevertheless momentary, will thus cause that circuit to go into oscillation. And, of course, if there was no way to supply the necessary power thereto at the predetermined resonant frequency, the initial oscillation would rather quickly damp out to nothing. It can be seen in each of the various figures how the 60 cycle current will initially induce a voltage in each of the resonant circuits—either through direct connecting electrical means (as conductors 14 and 15 in Fig. 1) or through magnetic means (for example, the flux produced in core leg 22 of Fig. 3 inducing a voltage in the coils to shock their respective resonant circuits into oscillating). It is felt that it is needless to describe just how each and every resonant circuit in all the various circuit arrangements are "kicked" into oscillation initially from the 60 cycle source as the magnetic or electrical tie-up in each circuit arrangement is quite evident from the drawings.

It has thus been further established that responsive to an initial application of 60 cycle source voltage to any circuit arrangement the various resonant circuits produce currents through their respective coils at their predetermined frequency. For example, in Fig. 1, the circuit including condenser 10 and its associated coil C will oscillate, if their electrical values are right, at 20 cycles per second. Similarly, in Fig. 1, the circuit including condenser 16 and its coil B will oscillate at, say 40 cycles per second—as in the present embodiment. As soon as the pre-tuned circuits begin to oscillate the current through their respective coils will produce a changing flux field in the core legs resulting in a single composite moving flux field in the center intersecting portion as hereinbefore described. Now as soon as the composite moving flux field is initiated, responsive to the initial oscillation of the tuned circuits, said flux field will cut the conductors of the coils as it is going through its Lissajous pattern and consequently induce a voltage into those coils at the particular oscillating frequency of their respective resonant circuits thereby sustaining oscillation in each circuit. In other words, in summarizing, once the tuned circuits are suddenly "shocked" or "kicked" into oscillating the resulting moving flux field produced by the oscillations will generate sustaining voltages at the correct frequency for maintaining each pre-tuned circuit continuously oscillating. An output voltage at the frequency of the particular tuned circuit concerned may thus be taken off of any of the condensers or coils. As mentioned hereinbefore the inventor was primarily interested in an output frequency of 20 cycles per second—the output terminals are obviously shown in the present embodiment.

It is to be understood that numerous modifications in the details of construction and the combination and arrangement of parts may be resorted to without departing from the spirit and scope of the invention as defined in the subjoined claims.

Having described my invention in detail, what I claim and desire to have protected by issuance of Letters Patent of the United States is:

1. In a self-starting frequency generator, a magnetic core having a triplicity of intersecting members intersecting at a common point, a plurality of pre-tuned circuits having their respective coils wound through pairs of diagonally opposite corners of the intersection, and a source of alternating current magnetically coupled to said core, sail alternating current source supplying power to said pre-tuned circuits for initiating and sustaining oscillations therein at their respective individual pre-determined frequencies.

2. In a self-starting frequency generator, a magnetic core having a triplicity of intersecting members intersecting at a common point, a plurality of individual coils wound through pairs of diagonally opposite corners of the intersection, a plurality of condensers connected to said plurality of coils to form pre-tuned circuits therewith, a source of alternating current magnetically coupled to said core for supplying the necessary power to initiate and sustain oscillations in each pre-tuned circuit at its respective frequency.

3. In a self-starting frequency generator, a magnetic core having a triplicity of intersecting members intersecting at a common point, a plurality of individual coils wound through each pair of diagonally opposite corners of the intersection, a source of alternating current directly connected to one of said coils, and a plurality of condensers connected to other of said coils to form pre-tuned circuits therewith, said alternating current source also being inductively connected to the other of said plurality of coils for initially shocking said pre-tuned circuits into oscillation, whereby said tuned circuits remain oscillating at their respective individual pre-determined frequencies.

4. In a self-starting frequency generator as claimed in claim 3, additional coils also wound through a plurality of pairs of diagonally opposite corners serially connected with a direct current source, thereby effecting stabilized operation.

5. In a self-starting frequency generator as claimed in claim 3, a source of direct current connected in parallel with one of said pre-tuned circuits, and a unidirectional device connected in series with said alternating current source, thereby causing stabilized operation over a varying load.

6. In a self-starting frequency generator, a magnetic core having a triplicity of intersecting members intersecting at a common point, a plurality of pre-tuned circuits having their respective coils wound through pairs of diagonally opposite corners of the intersection, and a source of alternating current magnetically coupled to said core, said alternating current source inducing an initial voltage in said pre-tuned circuits for establishing oscillation therein, whereby the flux initially produced by said alternating current source and said coils at the intersection effects a regenerative action for sustaining oscillations in said pre-tuned circuits.

7. In a self-starting frequency generator, a magnetic core having a triplicity of intersecting members intersecting at a common point, a plurality of individual coils wound through each pair of diagonally opposite corners of the intersection, a source of alternating current directly connected to one of said coils and inductively connected to the other of said coils, and a plurality of condensers connected to other of said coils to form pre-tuned circuits therewith, said alternating current source causing an initial exciting voltage to be induced in said pre-tuned circuits for initiating oscillations therein, whereby the flux produced by the initial currents in said coils effect a regenerative action for sustaining oscillations in said pre-tuned circuits.

8. In an electro-magnetic device, a magnetic core having a triplicity of intersecting members intersecting at a common point, a plurality of coils wound through each pair of diagonally opposite corners of the intersection, and means for supplying a different alternating current frequency to each of said coils, thereby producing a plurality of individual flux fields that combine in said intersection to form one composite flux field varying in magnitude as well as direction.

9. In an electromagnetic device, a symmetrical magnetic core having a triplicity of intersecting members intersecting at a common point, and a plurality of coils wound through each pair of diagonally opposite corners of the intersection with their magneto-motive force centers at the center of said magnetic core and with their axes each inclined at an angle with respect to each other so that a single resulting vector of flux at the center of said core so varies in magnitude and direction that it simultaneously induces electromotive forces of different frequencies in each of said coils.

10. In a self-starting frequency generator, a magnetic core having more than two intersecting members intersecting at a common point, a plurality of pre-tuned circuits having their respective coils wound through pairs of diagonally opposite corners of the intersection, and a source of alternating current magnetically coupled to said core, said alternating current source supplying power to said pre-tuned circuits for initiating and sustaining oscillations therein at their respective individual pre-determined frequencies.

HAROLD J. McCREARY.

REFERENCES CITED

The following references are of record in the file of this patent:

UNITED STATES PATENTS

| Number | Name | Date |
|---|---|---|
| 2,445,857 | McCreary | July 27, 1948 |
| 2,455,078 | McCreary | Nov. 30, 1948 |
| 2,461,992 | McCreary | Feb. 15, 1949 |